May 11, 1948.  W. V. BROWN ET AL  2,441,185
CAMERA DRIVE
Filed Sept. 17, 1943  2 Sheets-Sheet 1

INVENTORS
WILLIAM V. BROWN
& EDWIN H. DREW
BY Robert C. Rasche
ATTORNEY

May 11, 1948.　　W. V. BROWN ET AL　　2,441,185
CAMERA DRIVE
Filed Sept. 17, 1943　　2 Sheets-Sheet 2

INVENTORS
WILLIAM V. BROWN
& EDWIN H. DREW
BY
Robert C. Rasche
ATTORNEY

Patented May 11, 1948

2,441,185

UNITED STATES PATENT OFFICE 2,441,185

CAMERA DRIVE

William V. Brown, Flushing, and Edwin H. Drew, Amityville, N. Y., assignors to Republic Aviation Corporation, a corporation of Delaware Application September 17, 1943, Serial No. 502,774

2 Claims. (Cl. 88—17)

This invention relates to cameras generally and more specifically to an operating mechanism or drive whereby the film advancing mechanism of the camera is periodically operated from a constantly functioning or operating source of power to successively expose a series of individual film sections or frames, one section or frame of the film being exposed upon each operation of said film advancing mechanism.

Since the instant type of camera and associated mechanism is essentially designed and intended for use in conjunction with flight test equipment for aircraft it is the purpose hereof to provide an operating mechanism or drive, simple in construction, the operation of which may be initiated by the pilot and thereafter ignored, in combination with a signal coacting with the operating mechanism or drive to keep the pilot informed of its operation and of the periodic operation of the film advancing mechanism of the camera by said operating mechanism or drive.

The present invention also embodies means for protecting the camera mechanism from damage occasioned by the continued operation of the power source after an accidental or unintentional stoppage of the film advancing mechanism of the camera, or of the passage of the film through the camera.

With the above and other objects in view, as will be apparent, the invention consists in the construction, combination and arrangement of parts, all as hereinafter more fully described, claimed and illustrated in the accompanying drawings, wherein:

Figure 1:
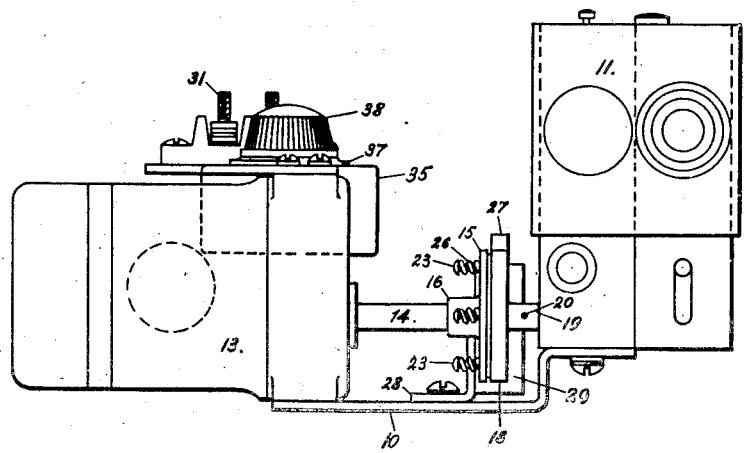
Fig. 1 is a front elevation of a camera illustrating the same in conjunction with the present operating mechanism or drive.
Figure 2:
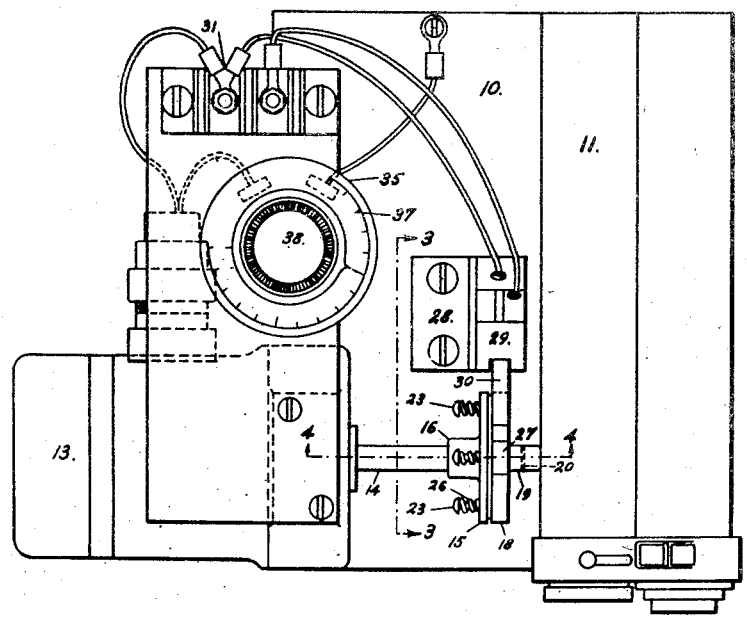
Fig. 2 is a plan view thereof.
Figure 3:
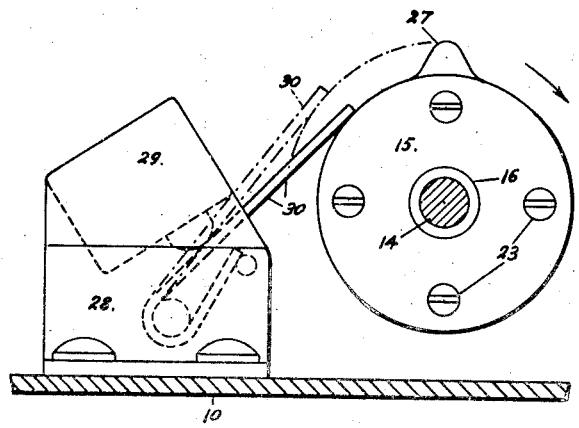
Fig. 3 is a vertical section taken along line 3—3 of Fig. 2 to illustrate the signal switch and its operation.
Figure 4:
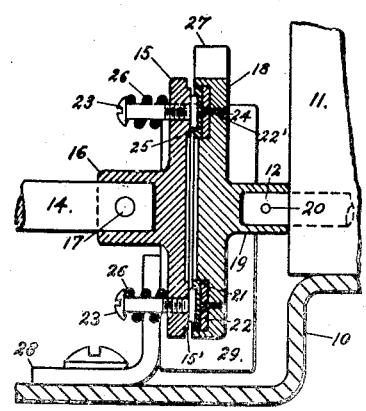
Fig. 4 is a vertical section taken along line 4—4 of Fig. 2 longitudinally through the shafts of the operating mechanism or drive and through the connection between them.

The present camera operating mechanism or drive is primarily designed to operate the camera used in conjunction with flight test equipment of the type disclosed in the George T. Burrell application Serial No. 402,069 filed July 12, 1941, which on June 12, 1945, matured into Patent No. 2,378,182. Essentially this invention resides in the camera operating mechanism or drive whereby the film advancing mechanism of the camera is periodically and regularly operated to successively expose one frame or section of the continuous film within the camera and to accomplish this without any supervision or control on the part of the pilot. Thus the operation of the device is initiated by the pilot after which its operation may be entirely ignored, the pilot being at all times informed as to the normal operation of the drive or operating mechanism and consequently is instantly apprised of its failure to operate.

Reference being had more particularly to the drawings 10 indicates a carrying or base plate for the camera and its operating mechanism or drive. At one end of the plate 10 is mounted the camera 11 of any suitable standard construction. The film advancing mechanism (not shown) of this camera 11 is operated to periodically expose one section or frame of the film at regular periodic intervals. The camera 11 may be of any suitable construction, provided, however, that it has a film advancing mechanism ever, that it has a film advancing mechanism whic which feeds the film through the camera for the periodic exposure of one frame or section thereof at a time.

For this purpose the camera is provided with the projecting shaft 12 for the operation of its film advancing mechanism, and for each rotation of the shaft 12 one section or frame of the film is exposed. Manifestly, therefore, by regulating the speed of rotation of the shaft 12, the length of the intervals between the exposures of sections or frames of the film can be determined.

A reversible electric motor 13 is mounted on the carrying plate 10 with its shaft 14 longitudinally aligned or coextensive with the shaft 12 of the film advancing mechanism of the camera 11. The shaft 14 of this motor 13 carries a disc 15 mounted on its terminal by collar 16 and fixed thereto by a pin 17 passing through both the collar 16 and the shaft 14. A similar disc 18, having a collar 19, is mounted on the protruding terminal of the shaft 12 of the film-advancing mechanism and is secured thereto by the pin 20 piercing the collar 19 and the protruding end of the shaft 12. The pin 20 is so constructed that it will be sheared off should the film advancing mechanism become inoperative or the film jam in the camera thereby disconnecting the continuously operating motor 13 from the shaft 12. This is an additional precautionary measure to protect the camera mechanism which may or may not be employed as circumstances dictate.

The discs 15 and 18, which are in effect clutch plates, are of substantially the same diameter, and have their faces positioned in close proximity, if not in actual functional contact. The disc 18, which is the driven clutch plate, is provided with a concentric groove 21 in its inner face in which is situated a clutch bearing member 22 of any suitable material. The disc 15, carried by the motor shaft 14, has an outstanding or projecting boss 15' and through the disc 15 and the boss 15' are threaded a series of screws 23, each screw being provided with a bearing head 24 at its inner end. A ring or annuls of friction material 25 is interposed between the bearing member 22 of the plate 18 and the several bearing heads 24 of the screws 23, these said bearing heads 24 being seated in sockets formed for the reception thereof in the adjoining face of the friction ring 25. Thus the heads 24 operating in sockets in the friction ring 25 not only exert an adjustable pressure on the friction ring 25 but hold it from any rotary or bodily movement relative to the disc 15 in a plane parallel to the plate 15.

Pins 22' or other suitable fastening means on the inner surface of the bearing member 22 engage the disc 18 and prevent any displacement of the member 22 or rotary movement thereof relative to the plate 18 in a plane parallel to the plane of said plate.

When the screws 23 exert the required pressure upon the friction ring 25 and it in turn has operative engagement with the bearing member 22, the discs 15 and 18 are frictionally connected for rotation in unison, so that as the shaft 14 of the motor 13 rotates so will rotate the shaft 12 of the film advancing mechanism of the camera 11. This pressure between the plates 15 and 18 can of course be regulated by the threaded adjustment of the screws 23. To prevent any retrograde movement of the screws or unintentional change in their adjustment a coil spring 26 surrounds the stem of each screw 23 between the outer face of the disc 15 and the head of the screw, and being always compressed, exerts sufficient pressure on the head of the screw to prevent any play between the threads of the screw and the threads of the aperture in the plate 15 and also tends to prevent any unintentional rotary movement by the screw.

From the foregoing it becomes manifest that the frictional engagement between the discs 15 and 18 may be adjusted by the screws 23 to determine the point at which the load on the shaft 12 will convert the contact from frictional driving engagement into a slipping non-driving contact. Thus if the load on the shaft 12 increases beyond the adjusted limit from any reason the driving contact between the discs 15 and 18 becomes a slipping contact and the rotation of the shaft 14 will not rotate the shaft 12 of the camera.

In order to provide means for informing the pilot as to the continued but periodic operation of the camera, the disc 18 carries a peripheral cam projection 27, which makes one complete rotation with the disc 18 for each rotation of the shafts 12 and 14. A bracket 28, positioned adjacent to the discs 15 and 18, carries a switch 29 under the control of a projecting spring switch lever 30 overlying the path of movement of the cam 27 and terminating in the approximate plane of the disc 18. As the disc 18 rotates under the influence of the motor 13, the cam 27 will contact the spring switch lever 30, once for each rotation of the shafts 12 and 14 and the discs 15 and 18, and for each time it so contacts the switch lever 30, the switch 29 will be closed and visible or other signal under the observation of the pilot will be operated.

Thus the operator is at all times apprised of the operating conditions of the camera and of its driving mechanism. For instance, if the connection between the plates 15 and 18 is loose, or becomes so damaged that the rotation of the shaft 14 will have no effect upon the shaft 12, the disc 18 will not rotate, and consequently the signal will not be operated by the cam 27. If the film advancing mechanism of the camera becomes inoperative or the film becomes jammed for any reason, a braking effect will be produced on the shaft 12 and its discs 18 and without the influence of the motor and its shaft 14 the shaft 12 would cease rotating. Under these circumstances the shaft 14 ceases to drive the shaft 12 because of the slippage between the cooperative faces of the discs 15 and 18 or because of the shearing of the pin 20 whereupon the rotation of the disc 18 is halted. When this occurs the signal to the operator under the control of the cam 27 ceases to operate periodically or upon each revolution of the disc 18, thereby informing the pilot of the failure of the apparatus. Also as the shaft 12 ceases its rotation under these conditions the camera 11 and its mechanism are protected.

Figure 5:
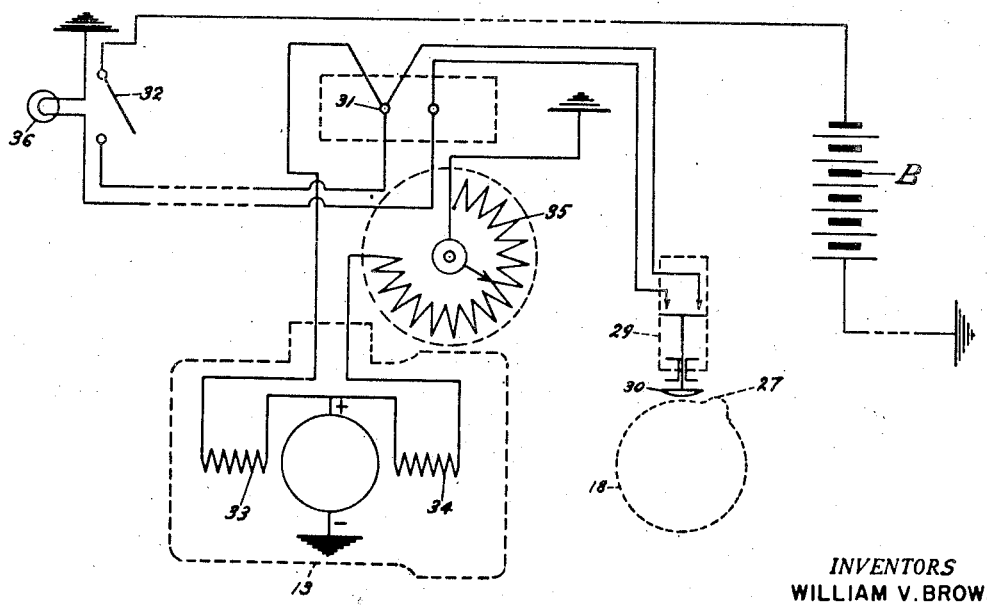
Fig. 5 illustrates diagrammatically the electrical features and wiring employed by this invention.

The embodiment of the present invention illustrated in the drawings and here described, includes a reversible electrical motor 13, though it is to be understood that any type of motor may be used in lieu thereof. In Figure 5 is illustrated diagrammatically the electrical connections for the control of the motor and for the operation of the signal. In the present preferred form of the invention, the signal comprises the lamp 36 connected on one side to ground and on the other side to one terminal of the switch 29. The opposite terminal of the switch 29 is connected to the common binding post 31 and thence to one side of a control switch 32. The opposite side of the control switch 32 is connected through battery B to ground. The common binding post 31 is also connected to one winding 33 of the reversible motor 13, while the opposed winding 34 of the motor is connected to ground through the rheostat 35. Since the motor rotates only in one direction in the functioning of the present invention, the second winding 34 thereof in circuit with the rheostat 35 is used as a brake to reduce or adjust the speed of the motor 13 when the occasion arises; thus the full power of the motor is always available through the winding 33 for its rotation in a clockwise direction, whereby the motor will always effectively start and operate the camera 11 and at the same time the secondary winding under the control of the rheostat 35 acts as a brake in reducing its speed when desired. A graduated scale 37 is provided in conjunction with the knob 38 of the rheostat, so that the R. P. M. of the motor 13 can be accurately and quickly determined. As the rheostat 35 is set with respect to the scale 36, so will the revolutions permitted of the motor be determined and the revolutions of the shaft 12 likewise be determined.

When the pilot desires the device to operate, he merely closes the switch 32, starting the motor 13 to rotate at a speed previously determined by the adjustment of the rheostat 35. From that point on, the operator need pay no attention to the camera 11 or its operating mechanism or drive unless the lamp 30 fails to periodically flash as the cam 27 rotates with the disc 18 and contacts the switch lever 30. Should this happen, he will instantly know that the camera is not operating, and consequently not recording the readings of the flight test instruments (not shown) with which it is cooperating.

The inventive concepts and several illustrative embodiments thereof having been thus disclosed in the manner required by the statutes, what is claimed as new, is:

1. In a flight-test recording device for making photographic records of the instruments in an aircraft comprising the combination with a camera, a film-advancing mechanism for the camera, a drive shaft for operating the film-advancing mechanism and an electric motor for rotating the drive shaft, of a signal device for indicating the condition of operation of the film-advancing mechanism, said signal device comprising a cam mounted on the drive shaft, a frangible connection between the drive shaft and motor, a switch interposed in the path of movement of said cam and movable to open and closed position by said cam, an electrical circuit including said switch, a source of electric current and a signal lamp, and means for regulating the speed of rotation of said motor and thereby determining the periodic time intervals at which said film-advancing mechanism will operate.

2. In a flight-test recording device as set forth in claim 1, in which the electric motor is of the reversible type.

WILLIAM V. BROWN.
EDWIN H. DREW.

REFERENCES CITED

The following references are of record in the file of this patent:

UNITED STATES PATENTS

| Number | Name | Date |
| --- | --- | --- |
| 1,658,361 | Tessier | Feb. 7, 1928 |
| 1,759,630 | Rinaldy | May 20, 1930 |
| 1,857,204 | Littlefield | May 10, 1932 |
| 1,928,434 | Pomeroy et al. | Sept. 26, 1933 |
| 2,051,785 | Foster | Aug. 18, 1936 |
| 2,083,646 | Fuller | June 15, 1937 |
| 2,156,440 | Veber | May 2, 1939 |
| 2,193,515 | Kessel | Mar. 12, 1940 |
| 2,260,299 | Cunningham et al. | Oct. 28, 1941 |
| 2,370,966 | Jochum | Mar. 6, 1945 |